(12) United States Patent
Rao

(10) Patent No.: US 12,288,043 B2
(45) Date of Patent: Apr. 29, 2025

(54) FUSED MODULAR MULTIPLY AND ADD OPERATION

(71) Applicant: International Business Machines Corporation, Armonk, NY (US)

(72) Inventor: Rajat Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 17/513,974

(22) Filed: Oct. 29, 2021

(65) Prior Publication Data

US 2023/0137220 A1 May 4, 2023

(51) Int. Cl.
G06F 7/72 (2006.01)
G06F 7/499 (2006.01)
G06F 7/544 (2006.01)

(52) U.S. Cl.
CPC ............ *G06F 7/72* (2013.01); *G06F 7/49931* (2013.01); *G06F 7/5443* (2013.01)

(58) Field of Classification Search
CPC ...... G06F 7/49931; G06F 7/5443; G06F 7/72; G06F 7/722; G06F 7/727; G06F 9/3893
See application file for complete search history.

(56) References Cited

U.S. PATENT DOCUMENTS 7,461,117 B2 12/2008 Trong et al.
10,853,065 B2 12/2020 Corbal et al.

2008/0256150 A1 10/2008 Quinnell et al.
2011/0276790 A1 11/2011 Olson et al.
2019/0042242 A1 2/2019 Das et al.
2020/0150930 A1 5/2020 Carr et al.
2020/0310761 A1* 10/2020 Rossi ...................... H03M 7/18

FOREIGN PATENT DOCUMENTS

CN 109214213 A 1/2019
CN 113190211 A 7/2021
WO 2021217034 A1 10/2021

OTHER PUBLICATIONS

International Search Report and Written Opinion; Mailed: Dec. 22, 2022; Application No. PCT/CN2022/124644; Filed: Oct. 11, 2022; 9 pages.

(Continued)

*Primary Examiner* — Matthew D Sandifer
(74) *Attorney, Agent, or Firm* — CANTOR COLBURN LLP; Edward Wixted

(57) ABSTRACT

A computer-implemented method includes receiving performing a fused modular multiply and add operation to compute d=((a*b)+c) % p, wherein a, b, and c, are provided as a set of operands. A first multiply-and-accumulate unit computes a binary multiplication to compute a*b. A second multiply-and-accumulate unit computes a first intermediate result by updating a result of the binary multiplication using p. An accumulator of a third multiply-and-accumulate unit is initialized with c. The third multiply-and-accumulate unit computes a second intermediate result using the first intermediate result and c. An adder unit subtracts a portion of the second intermediate result from a portion of the result of the binary multiplication. The output of the adder is provided as a result of the fused modular multiply and add operation.

20 Claims, 8 Drawing Sheets

(56) References Cited

OTHER PUBLICATIONS

Fortin et al., "High performance SIMD modular arithmetic for polynomial evaluation," Concurrency and Coomputation: Practice and Experience, vol. 33, No. 16, Apr. 23, 2020, pp. 1-24.
Monagan et al., "High performance SIMD modular arithmetic for polynomial evaluation," arXiv.2004.11571v1, Apr. 2020, pp. 1-24.
Shukla et al., "Hardware Optimizations for Crypto Implementations," 20th International Symposium on VLSI Design and Test, May 27, 2016, pp. 1-10.

* cited by examiner

FUSED MODULAR MULTIPLY AND ADD OPERATION

BACKGROUND

The present invention generally relates to computer technology and, more specifically, to performing arithmetic operations by implementing a fused modular multiply and add (FMMA) operation.

Computers are typically used for applications that perform arithmetic operations. Several applications like cryptography, Blockchain, machine learning, image processing, computer games, e-commerce, etc., require such operations to be performed efficiently (e.g., fast). Hence, the performance of integer arithmetic has been the focus of both academic and industrial research.

Several existing techniques are used to improve the performance of the computers, particularly processors and/or arithmetic logic units by implementing the arithmetic instructions to take advantage of, or to adapt, the calculation process to the architecture of the hardware. Examples of such techniques include splitting an instruction into multiple operations, where each operation is performed in parallel, two or more operations are combined to reduce memory accesses, the operations are ordered so as to reduce memory access time, operands are stored in a particular order to reduce access time, etc. With applications such as cryptography and machine learning, different types of arithmetic operations can be required.

SUMMARY

According to one or more embodiments of the present invention, a computer-implemented method includes receiving, by a processing unit, an instruction to perform a fused modular multiply and add operation to compute $d=((a*b)+c) \% p$, wherein a, b, and c, are provided as a set of operands. The method further includes computing, by a first multiply-and-accumulate unit, a binary multiplication to compute $a*b$. The method further includes computing, by a second multiply-and-accumulate unit, a first intermediate result by updating a result of the binary multiplication using p. The method further includes initializing an accumulator of a third multiply-and-accumulate unit with c. The method further includes computing, by the third multiply-and-accumulate unit, a second intermediate result using the first intermediate result and c. The method further includes subtracting, by an adder, a portion of the second intermediate result from a portion of the result of the binary multiplication. The method further includes outputting, as a result of the fused modular multiply and add operation, an output of the adder.

According to one or more embodiments of the present invention, a system includes a set of registers, and a set of multiply-and-accumulate units comprising three multiply-and-accumulate units, each including a multiplier and an accumulator. The set of multiply-and-accumulate units are coupled with the set of registers. The set of multiply-and-accumulate units is configured to perform a method for performing a fused modular multiply and add operation to compute $d=((a*b)+c) \% p$, wherein a, b, and c, are provided in the set of registers. A method to perform the fused modular multiply and add operation includes computing, by a first multiply-and-accumulate unit, a binary multiplication to compute $a*b$. The method further includes computing, by a second multiply-and-accumulate unit, a first intermediate result by updating a result of the binary multiplication using p. The method further includes initializing an accumulator from a third multiply-and-accumulate unit with c. The method further includes computing, by the third multiply-and-accumulate unit, a second intermediate result using the first intermediate result and c. The method further includes subtracting, by an adder, a portion of the second intermediate result from a portion of the result of the binary multiplication. The method further includes outputting, as a result of the fused modular multiply and add operation, an output of the adder.

According to one or more embodiments of the present invention, a computer program product includes a computer-readable memory that has computer-executable instructions stored thereupon, the computer-executable instructions when executed by a processor cause the processor to perform a method for performing a fused modular multiply and add operation to compute $d=((a*b)+c) \% p$, wherein a, b, and c, are provided as operands, and wherein performing the fused modular multiply and add operation. The method to perform the fused modular multiply and add operation includes computing, by a first multiply-and-accumulate unit, a binary multiplication to compute $a*b$. The method further includes computing, by a second multiply-and-accumulate unit, a first intermediate result by updating a result of the binary multiplication using p. The method further includes initializing an accumulator from a third multiply-and-accumulate unit with c. The method further includes computing, by the third multiply-and-accumulate unit, a second intermediate result using the first intermediate result and c. The method further includes subtracting, by an adder, a portion of the second intermediate result from a portion of the result of the binary multiplication. The method further includes outputting, as a result of the fused modular multiply and add operation, an output of the adder.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
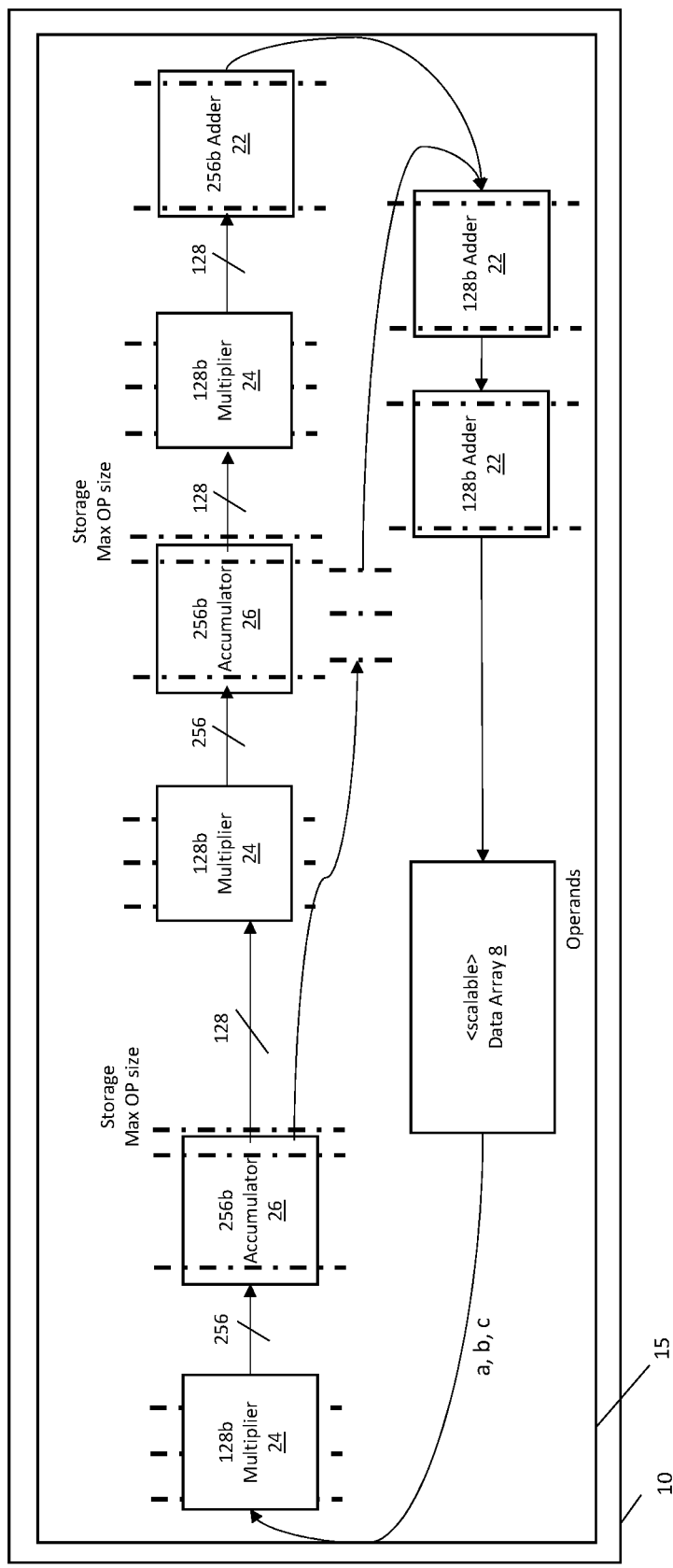
FIG. 1 depicts a set of hardware components of a processor used to compute a modular multiplication and addition.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Technical solutions are described herein to improve the efficiency of a computer processor by facilitating performance of a fused modular multiply and add (FMMA) operation. In computer systems, the arithmetic operations of addition and multiplication are used frequently. A fused multiply and add instruction (FMA) is a common method to perform a multiply and add operation with a single instruction in order to reduce the number of instructions to be executed, as well as to reduce memory accesses, and in turn improving execution efficiency. The FMA instruction is a widely used instruction in both integer and floating point operations.

Embodiments of the present invention address a technical challenge of improving performance when performing modular addition and modular multiplication operations, by performing a fused operation that reduces the number of instructions and memory accesses compared to the two operations performed separately. Embodiments of the present invention facilitate a single instruction to perform an FMMA operation, and techniques to implement such an operation on state-of-the-art hardware.

Modular arithmetic is frequently used in several computer applications such as encryption, blockchain, artificial intelligence, etc. Accordingly, by providing an improvement in execution of such applications by providing the FMMA operation/instruction, embodiments of the present invention provide a practical application in the field of computing technology, and at least to the fields where such FMMA operations are used. Further, embodiments of the present invention provide an improvement to computing technology itself by improving the execution of modular multiplication and addition operations.

Computer systems typically use binary number representation when performing arithmetic operations. Further, the computer system, and particularly a processor and an arithmetic logic unit (ALU) of the processor, have a predefined "width" or "word size" (w), for example, 32-bit, 64-bit, 128-bit, etc. The width indicates a maximum number of bits the processor can process at one time. The width of the processor can be dictated by the size of registers, the size of the ALU processing width, or any other such processing limitation of a component associated with the processor.

Table 1 provides the Barret Modular Multiplication algorithm that is typically used to perform modular multiplication in computing systems. Column 1 of Table 1 shows the sequence of calculations performed to compute a modular multiplication of operands a, b, with a prime p. With a, b, and p as inputs, the output of the modular multiplication is r=(a*b) % p, which is computed as shown in column 1. In column 2 of Table 1, bit-width required for the calculations are shown assuming k is the bit width of the processor.

TABLE 1

| Column 1 | Column 2 |
|---|---|
| Require: k = bitwidth, a, b = operands, p = prime<br>Return: r = (a * b) % p<br>1. Precompute $\mu = \text{floor}\frac{2^{2k}}{p}$<br>2. Binary mul res = a * b<br>3. Binary mul q2 = res(1 + hi) * µ<br>4. Binary mul r2 = q2(1 + hi) * p<br>5. Binary sub r = res(lo + 1) − r2(lo + 1)<br>6. Correct r − Add $2^{k+1}$ or subtract p or subtract 2p | Bit width calculations<br>(2k + 1) − k = k + 1<br>k * k = 2k<br>(k + 1) * (k + 1) = 2k + 2<br>(k + 1) * k = 2k + 1<br>(k + 1) − (k + 1) = (k + 1)<br>(k + 1) -> k |

Table 2 provides the Montgomery Modular Multiplication algorithm that is typically an alternative used to perform modular multiplication in computing systems. Column 1 of Table 2 shows the sequence of calculations performed to compute the modular multiplication of operands a, b, with a prime p. With a, b, and p as inputs, the output of the modular multiplication in this case is $c=(a*b*R^{-1})$ % p, which is computed as shown in column 1. Here, X(lo) and X(hi) representations indicate the lower half of bits in X, and higher half of bits in X, respectively. In column 2 of Table 2, bit-width required for the calculations are shown assuming k is the bit width of the processor. Here, w is a value that depends on the word size of the processor.

| Column 1 | Column 2 |
|---|---|
| Require: k = bitwidth, a, b = operands, p = prime, $R = 2^k$<br>Return: c = (a * b * $R^{-1}$) % p<br>1. Precompute ($p^{-1}$%R)<br>2. Binary mul T = a * b<br>3. Binary mul m = [T(lo) * $p^{-1}$] % R<br>4. Binary mul mp = m * p<br>5. Binary sub t = T(hi) − mp(hi)<br>6. Correction Add p if t < 0 | Bit width calculations<br>k-bits<br>k * k = 2k<br>k*w = k + w (LSb)<br>k*k = 2k<br>k − k = k<br>k –> k |

Further, as can be seen from Table 1 and Table 2, the existing solutions require at least three separate multiplications to be performed. Embodiments of the present invention, as described herein, fuse such multiplications to reduce the data access and instruction execution time. Additionally, embodiments of the present invention facilitate fusing an addition operation.

FIG. 1 depicts a set of hardware components of a processor used to compute a modular multiplication and addition. The processor 10 can include an ALU 15 with one or more components to compute the modular multiplication and addition. One or more components of the ALU 15 can use pipelining to improve efficiency of computation in one or more embodiments of the present invention. Further, in some embodiments of the present invention, result(s) of one or more components depicted can be stored, for example, in memory, in registers, etc., as intermediate values. The components that store intermediate (or final) results are also identified in FIG. 1.

The components of the ALU 15 include one or more instances of adders 22, multipliers 24, and accumulators 26. FIG. 1 also depicts a code array 14 that includes the instructions to be executed, including the operands that are to be used for the modular multiplication and addition.

Further, FIG. 1 depicts bit-widths (e.g., 128b, 256b) of the one or more components in the ALU 15, as well as the width of data transferred from one component to the other during the computations. It is understood that the bit-widths can be varied in one or more embodiments of the present invention. However, the bit-width of the hardware can limit the modular multiplication and addition that can be performed on that hardware.

The pipeline depicted in FIG. 1 is used in typical implementations of the Barret and Montgomery modular multiplications shown in Table 1 and Table 2, respectively. As can be seen, three multipliers 24 are required. Further, the pipeline does not include the addition operation that embodiments of the present invention provide after fusing the multiplications.

Embodiments of the present invention provide two FMMA instructions. A first FMMA instruction computes the Barrett modular multiplication followed by an addition in a fused manner. The syntax for the first FMMA instruction is fmma_b a, b, c, d. A second FMMA instruction that is provided computes the Montgomery modular multiplication followed by an addition in a fused manner. The syntax for the second FMMA instruction is fmma_m a, b, c, d. In the case of the Montgomery Algorithm the operands are in Montgomery form and the produced result is also in the Montgomery form. The conversion of numbers to and from Montgomery form can be performed using techniques that are already known or are developed in the future, without affecting the technical solutions provided by embodiments of the present invention.

Here, a, b, c, and d, are the operands, and can be registers in the processor 10. In both cases, the output computes d=((a*b)+c) % p. In some embodiments of the present invention, the prime p can also be an operand in the instruction syntax, but in the description herein p is assumed here that the ALU 15 has been initialized (step 1 in both Barrett/Montgomery) with the prime and pre-computations before the fmma_b/fmma_m instructions are invoked.

Figure 2:
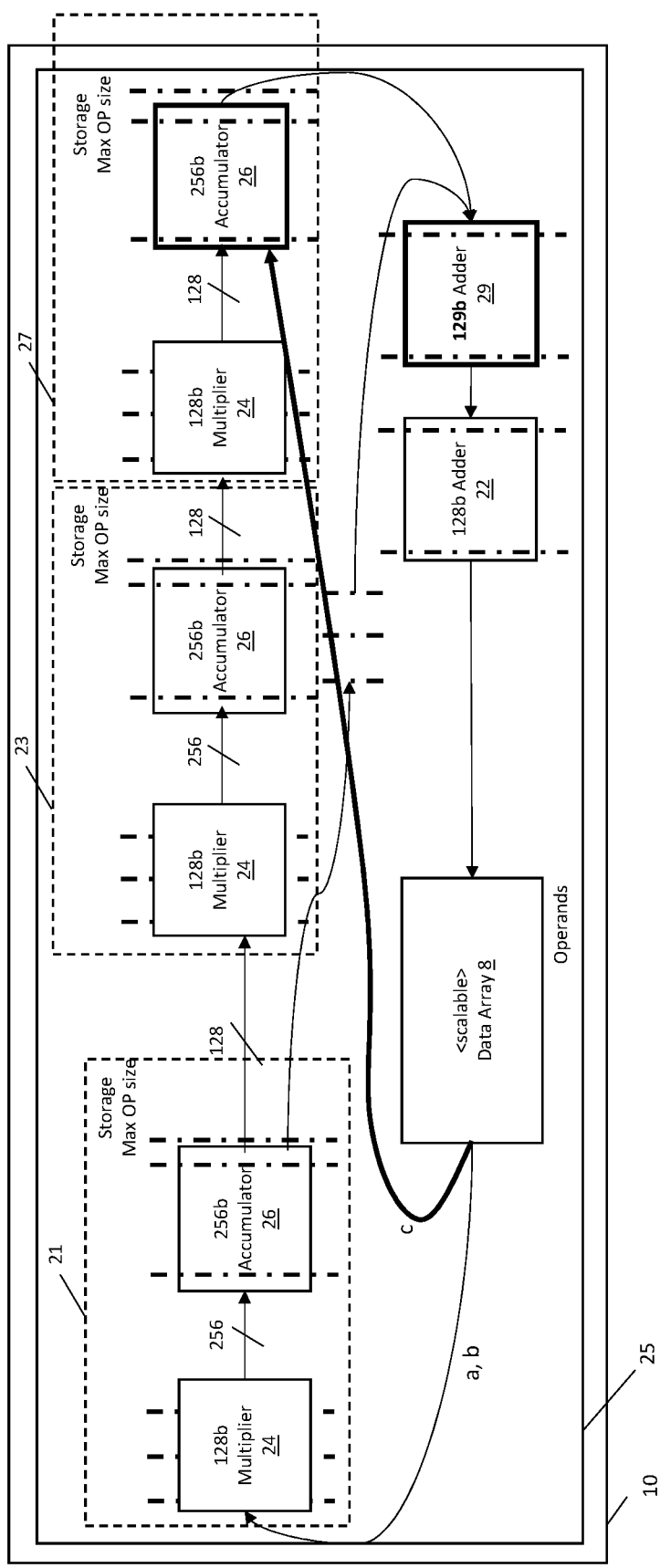
FIG. 2 depicts an architecture of a modular arithmetic and logic unit that facilitates executing a fused multiplication and addition instruction according to one or more embodiments of the present invention.

FIG. 2 depicts an architecture of a modular ALU that facilitates executing an FMMA instruction according to one or more embodiments of the present invention. The modular ALU 25 includes one or more instances of adders 22, multipliers 24, and accumulators 26, and uses pipelining similar to the ALU 15. However, an accumulator 26 is used in place of an adder 22. The ALU 25, thus, includes three multiply-and-accumulate (MAC) units, 21, 23, 27, each MAC block including a multiplier 24 and an accumulator 26. Further, an adder 29 with additional bit width (e.g., 129 bit) is used subsequent to the three MAC units 21, 23, 27. In some embodiments of the present invention, the bit width of the adder 29 is one more than the bit width of the multipliers 24 in the three MAC units 21, 23, 27.

In the ALU 25, the operands a, b are read and used by the MAC 21, and the operand c is read by the MAC 27, particularly, by the accumulator 26 of the MAC 27. The adder 29 with the wider bit-width receives the output from the MAC 27.

Figure 3:
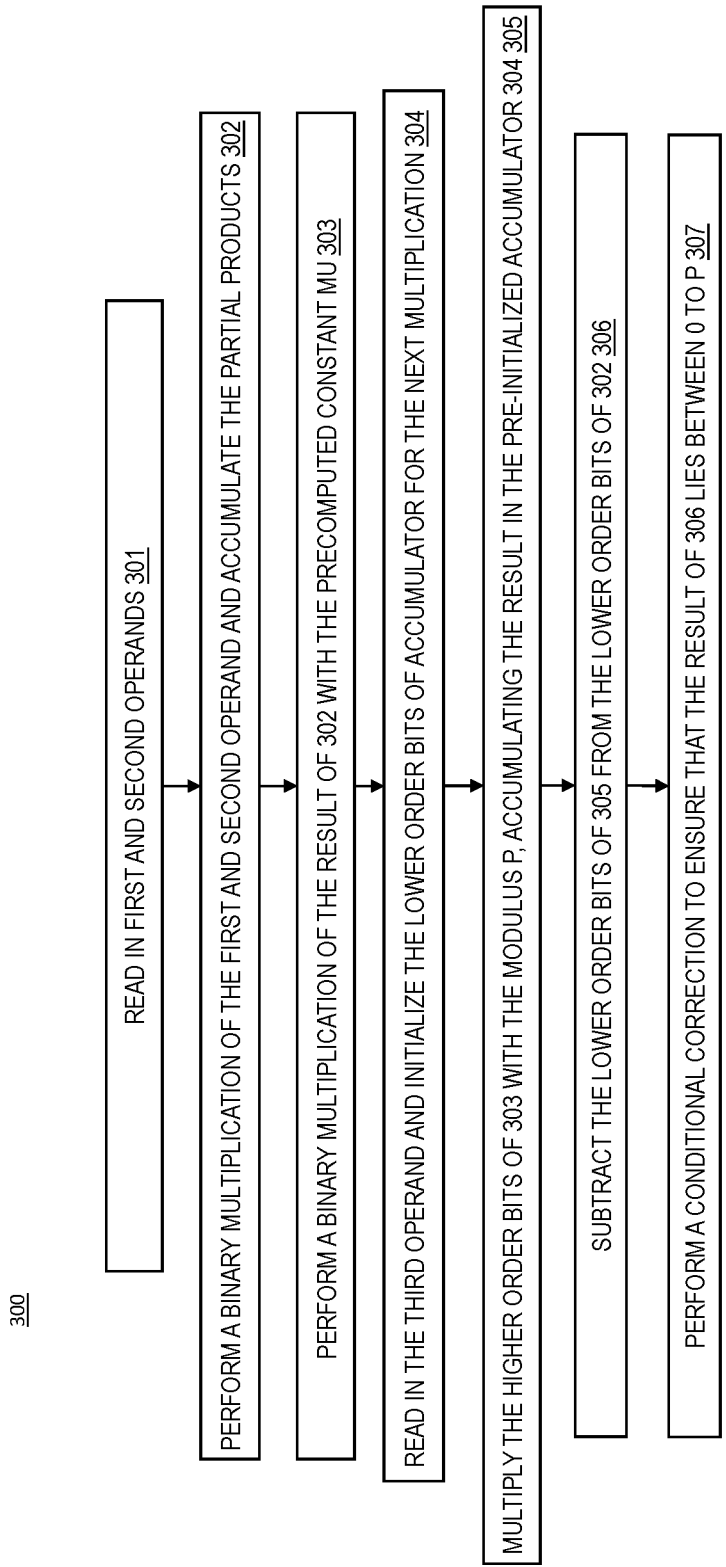
FIG. 3 depicts a flowchart of a method to perform an FMMA_B instruction according to one or more embodiments of the present invention.

FIG. 3 depicts a flowchart of a method to perform the FMMA_B instruction according to one or more embodiments of the present invention. The method 300 includes reading in the first and second operands a, b from into the first MAC 21, at block 301. The operands are read from the data array 8. At block 302, the first MAC 21 performs a binary multiplication of the first and second operands and accumulates the partial products.

At block 303, the second MAC 23 performs a binary multiplication of the result of block 302 with a predefined constant Mu. In one or more embodiments of the present invention, Mu is stored in the second MAC 23.

At block 304, the third operand c is read to initialize the accumulator 26 in the third MAC 27. The third operand is read into the lower order bits of the accumulator 26 of the third MAC 27. For example, if the accumulator 26 is 256 bit wide, and the operand c is 128 bit wide, c is stored in the bits 128-255 of the accumulator 26. It should be noted that the third operand can be read into the third MAC in parallel with the binary multiplications in the first MAC 21 and the second MAC 23.

At block 305, the third MAC 27 multiplies the higher order bits of the result from step 303 with the modulus p, and accumulates the result in the pre-initialized accumulator 26 of the third MAC 27. Here, the "higher order bits" can represent the first half of the result from step 303 (e.g., first 128 bits from a 256 bit value).

At block 306, the adder 22 subtracts the lower order bits of the result in step 305 from the lower order bits of the result in step 302. The results of the steps 302 and 305 are the values stored in the accumulators 26 in the first MAC 21 and the third MAC 27, respectively.

At block 307, a conditional correction is performed to ensure that the result from the step 306 is in the valid range 0 to p.

The FMMA_B instruction executed in this manner is more efficient than present sequential pipelined executions of modular multiplication and addition operations. Consider performing an fmma_b on 512-bit operands using ALU 25 according to one or more embodiments of the present invention. As described, the third operand is used to initialize the lower 512 bits of the accumulator 26 in the third MAC 27. The "Storage MAX OP Size" guarantees that the accumulator has enough bit width to write the third operand in. The accumulator 26 in the third MAC 27 then operates on the output of the multiplier 24 and accumulates the data (i.e., adds the output with the pre-initialized third operand). There is a possibility that there are a total of 513 bits in the result of the third MAC 27-512 from the multiplication and an additional bit due to the initial state of the accumulator 26. These bits are fed to the 129-bit adder 29 to perform step 5 in Table 1.

Here, because a 512-bit operation is performed with 128 bit width, the bits are fed over a course of 4 clocks in some embodiments of the present invention. The first 3 clocks will have 128 bits each and the final clock will empty out the last 129 bit. In other embodiments, the read-out can be performed with fewer or additional clocks.

In this manner, a fused modular multiplication and addition is performed by the ALU 25 using the Montgomery modular multiplication. The FMMA_M performed in this manner improves the efficiency by requiring fewer resources compared to performing the modular multiplication and addition separately, and sequentially.

Figure 4:
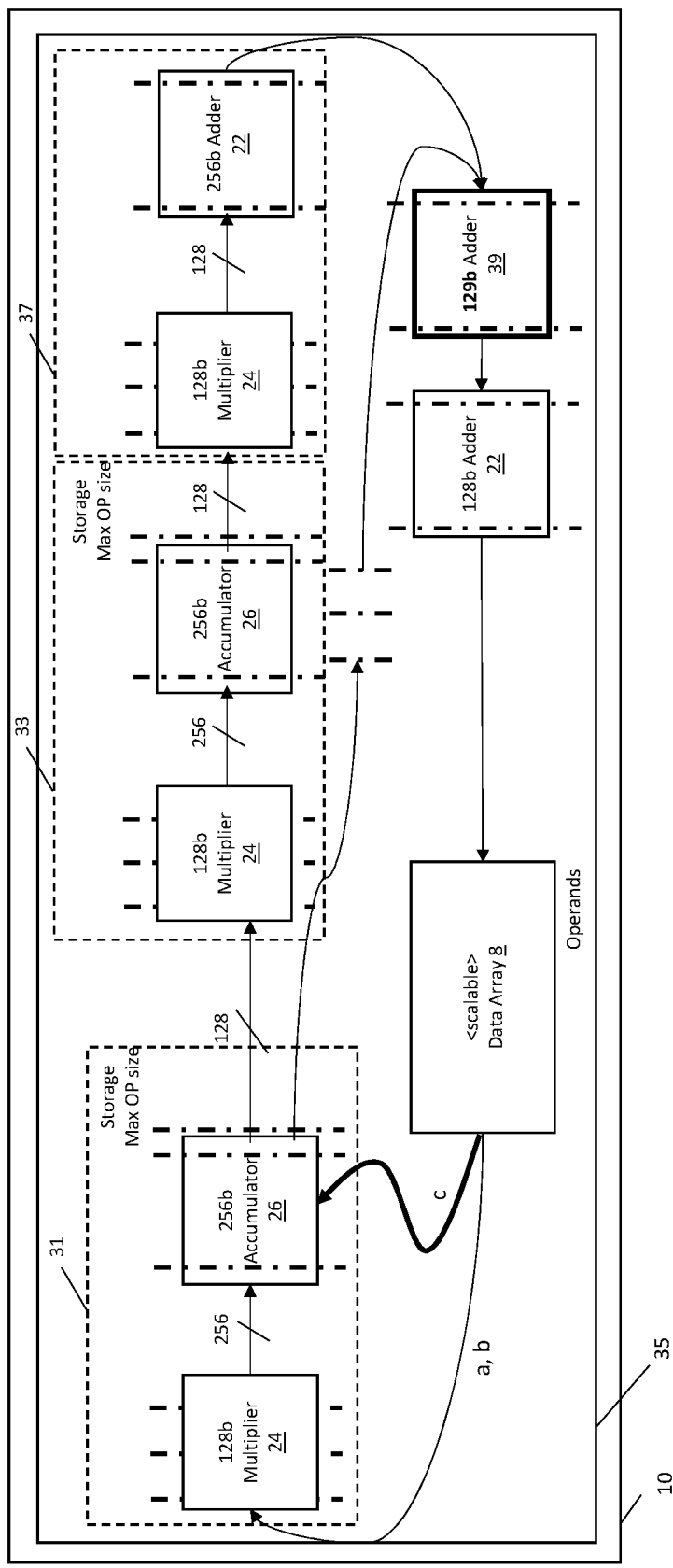
FIG. 4 depicts an architecture of a modular arithmetic and logic unit that facilitates executing a fused multiplication and addition instruction according to one or more embodiments of the present invention.

FIG. 4 depicts an ALU that facilitates executing an FMMA instruction according to one or more embodiments of the present invention. The modular ALU 35 includes one or more instances of adders 22, multipliers 24, and accumulators 26, and uses pipelining similar to the ALU 15. Here, the ALU 35 includes three MAC units, a first MAC 31, a second MAC 33, and a third MAC 37. An adder 39 with additional bit width (e.g., 129 bit) is used subsequent to the three MAC units 31, 33, 37. In some embodiments of the present invention, the bit width of the adder 39 is one more than the bit width of the multipliers 24 in the three MAC units 31, 33, 37.

In ALU 35, the third operand c is read and used to initialize the higher order bits of the first MAC unit's 31 accumulator 26. The adder 39 with the wider bit-width receives the output from the MAC 37.

Figure 5:
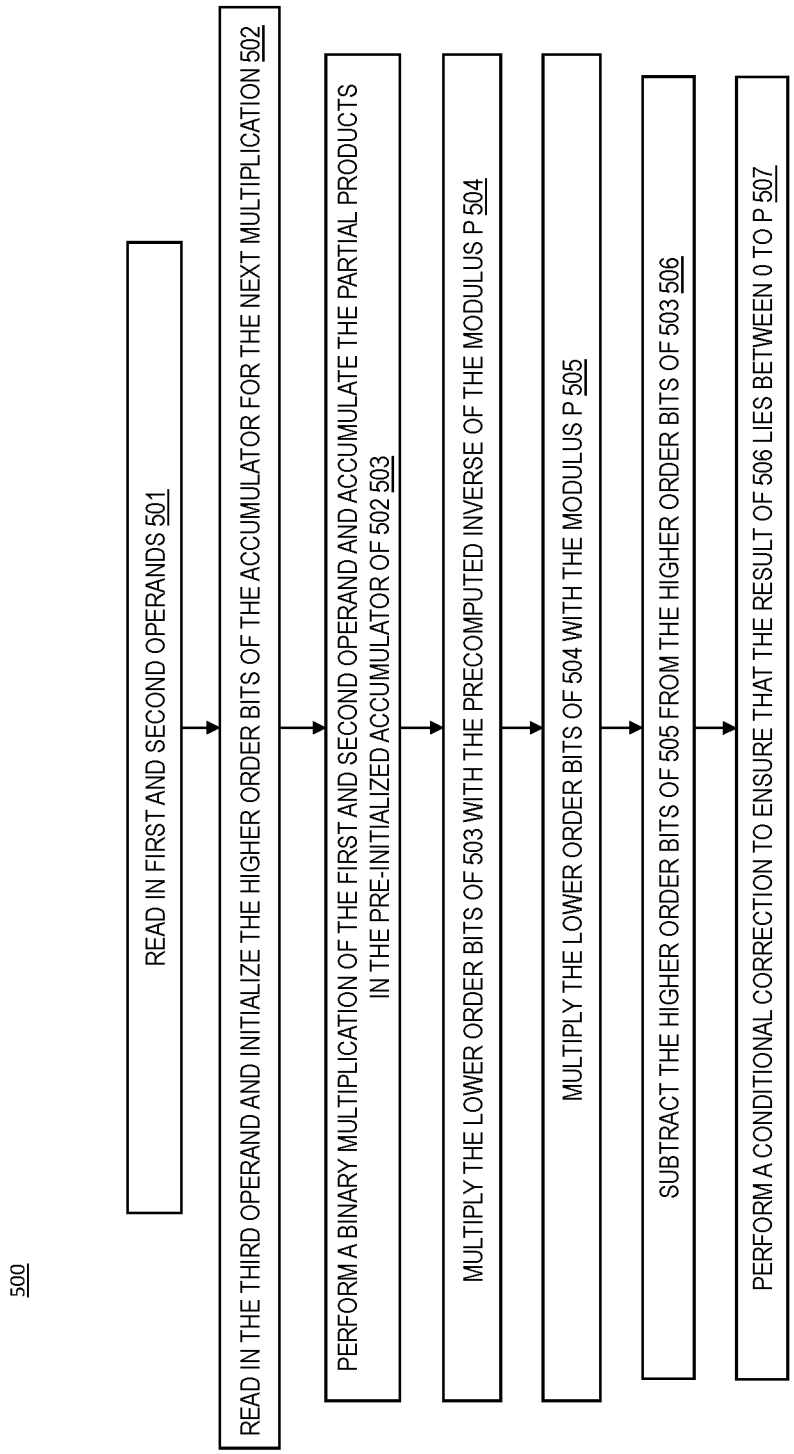
FIG. 5 depicts a flowchart of a method to perform an FMMA_M instruction according to one or more embodiments of the present invention.

FIG. 5 depicts a flowchart of a method to perform the FMMA_M instruction according to one or more embodiments of the present invention. The method 500 includes reading in the first and second operands a, b from into the first MAC 31, at block 501. The operands are read from the data array 8. At block 502, the accumulator 26 of the first MAC 31 is initialized by reading in the third operand c into the higher order bits of the accumulator 26.

At block 503, a binary multiplication of the first and second operands is performed and the result is accumulated with the pre-initialized accumulator 26 of the first MAC 31. The third operand c is accordingly added into the result of the binary multiplication of the first two operands.

At block 504, the lower order bits of 503 are multiplied with the precomputed inverse of the modulus P by the second MAC 33. The second MAC 33 is initialized with the value of p prior to invoking the method 500 in some embodiments of the present invention.

At block 505, the third MAC 37 multiplies the lower order bits of step 504 with the modulus p. The modulus p is stored in the third MAC 37 prior to invoking the method 500 in some embodiments of the present invention.

Further, at block 506, the adder 39 subtract the higher order bits of the result of step 505 from the higher order bits of the result of the step 503. The adder 39 can compute a subtraction using 2's complement, or any other known technique.

At block 507, a conditional correction is performed to ensure that the result from the step 506 is in the valid range 0 to p.

Here, the "higher order bits" can represent the first half of the result from one or more steps (e.g., bits 0-127 from a 256 bit value), and the "lower order bits" represent the second half of the result (e.g., bits 128-255 from a 256 bit value). The results of the steps 503, 504, and 505 are the values stored in the accumulators 26 in the first MAC 31, second MAC 33, and the third MAC 37, respectively.

The FMMA_M instruction executed in this manner is more efficient than present sequential pipelined executions of modular multiplication and addition operations. Consider performing an fmma_m on 128-bit operands using ALU 35 according to one or more embodiments of the present invention. The third operand is used to initialize the higher 128 bits of the 256-bit accumulator 26 of the first MAC unit 31. The lower 128 bits of the result of the accumulator 26 are passed on to the next, i.e., second and third MAC units 33, 37. In some cases, there can be 129 higher bits—128 due to the multiplication and an additional bit due to the initial state of the accumulator 26 of the first MAC 31. These 129 bits are then passed on to the adder 39 to perform step 5 in table 2.

Embodiments of the present invention enhances the support of existing modular arithmetic units to support a fused multiply and add with minimal hardware changes. The amount of hardware change is only to increase an adder's width by 1-bit (e.g., adder 29, 39). By initializing an accumulator with the third operand, the FMMA can be achieved using either modular multiplication algorithm that a user may desire. Further, by performing the FMMA by the initializing the accumulator, embodiments of the present invention improve the operation of the processor when modular multiplication and addition operations are required in sequence. The overall latency of a modular multiplication and a fused modular multiply and add operation are both exactly the same. So, embodiments of the present invention provide an improvement in the number of instructions needed and also the total latency of an operation that can exploit fmma.

Figure 6:
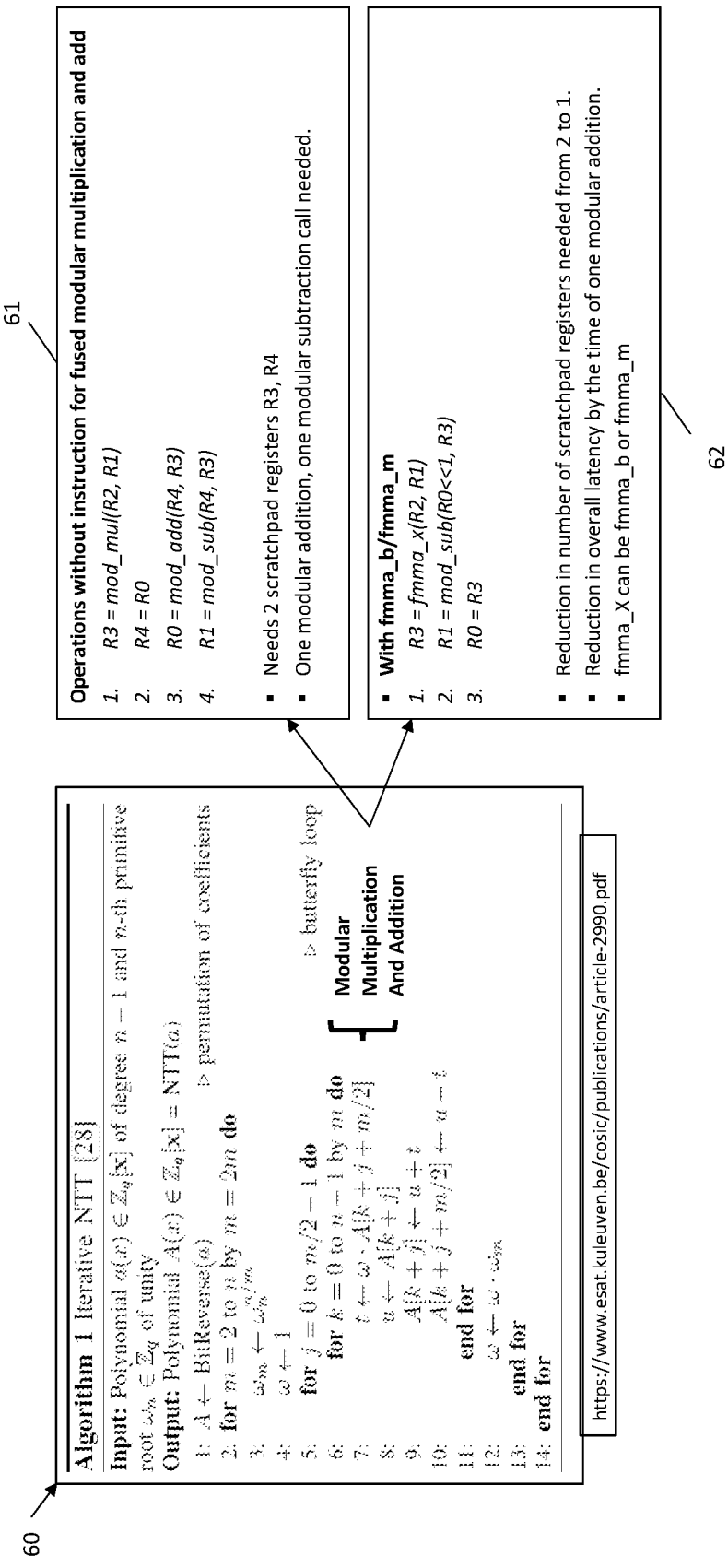
FIG. 6 depicts an example scenario where a fused modular multiply and add instruction improves efficiency of operation according to one or more embodiments of the present invention.

FIG. 6 depicts an example scenario where an FMMA instruction improves efficiency of operation according to one or more embodiments of the present invention. Consider the example code 600 of an algorithm to perform an Iterative Number Theoretic Transform (NTT) algorithm that includes a butterfly operation. It is understood that any other algorithm/code that requires a FMMA operation can be used instead of the depicted example, and that FMMA instructions described herein can be used in any other code. For the example 60, assume A[k+j] is in register R0, A[k+j+m/2] in in R1, w in R2 and R3, R4 are temporary scratchpad registers.

As shown in block 61, an ALU (e.g., ALU 15) that cannot execute a fused modular multiplication and add instruction uses two scratchpad registers (e.g., R2, R4), and four instruction calls are required to perform the required. As shown in block 62, by using any one of the fmma instructions described herein, the number of scratchpad registers needed is reduced from 2 to 1. Further, overall latency is reduced by the time of at least one modular addition.

Accordingly, embodiments of the present invention facilitate an improvement to computing technology by providing a practical application to implement a single instruction to perform a fused modular multiply and add operation. As provided herein, the fused operation can be implement on state-of-the-art hardware without significant hardware changes.

Figure 7:
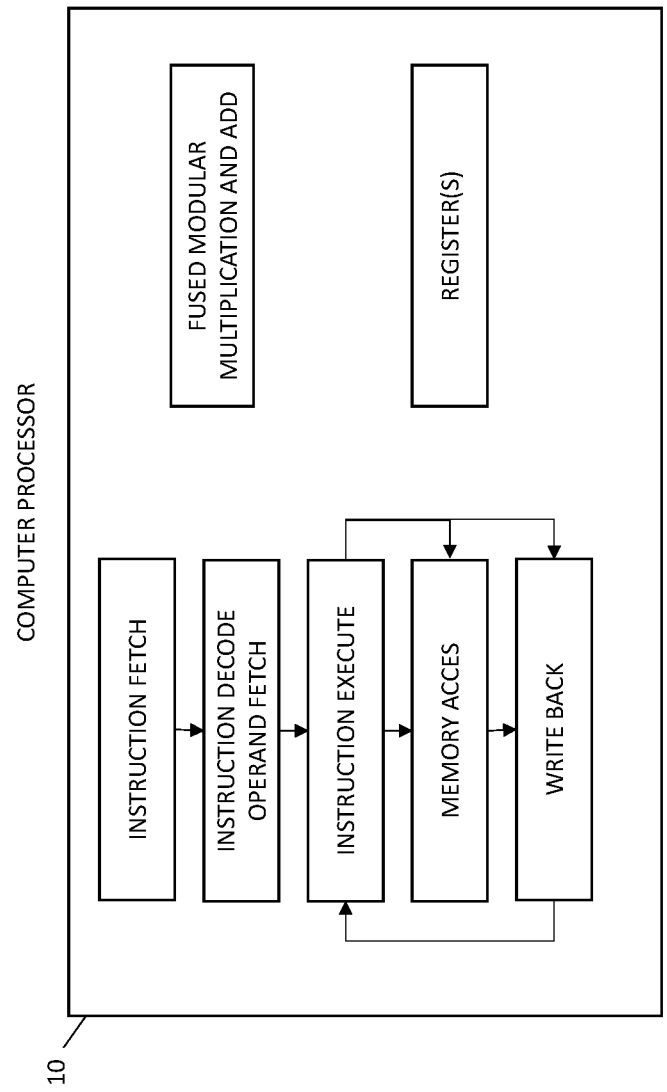
FIG. 7 depicts a block diagram of a processor according to one or more embodiments of the present invention.

FIG. 7 depicts a block diagram of a processor according to one or more embodiments of the present invention. The processor 10 can include, among other components, an instruction fetch unit 601, an instruction decode operand fetch unit 602, an instruction execution unit 603, a memory access unit 604, a write back unit 605, a set of registers 12, and a FMMA executor 606. In one or more embodiments of the present invention, the FMMA executor 606 can be part of an arithmetic logic unit (ALU) (not shown).

In one or more embodiments of the present invention, the processor 10 can be one of several computer processors in a processing unit, such as a central processing unit (CPU), a graphics processing unit (GPU), a tensor processing unit (TPU), or any other processing unit of a computer system. Alternatively, or in addition, the processor 10 can be a computing core that is part of one or more processing units.

The instruction fetch unit 601 is responsible for organizing program instructions to be fetched from memory, and executed, in an appropriate order, and for forwarding them to the instruction execution unit 603. The instruction decode operand fetch unit 602 facilitates parsing the instruction and operands, e.g., address resolution, pre-fetching, prior to forwarding an instruction to the instruction execution unit 603. The instruction execution unit 603 performs the operations and calculations as per the instruction. The memory access unit 604 facilitates accessing specific locations in a memory device that is coupled with the processor 10. The memory device can be a cache memory, a volatile memory, a non-volatile memory, etc. The write back unit 605 facilitates recording contents of the registers 12 to one or more locations in the memory device. The FMMA executor 606 facilitates executing the FMMA instruction as described herein (either fmma_b, or fmma_b).

It should be noted that the components of the processors can vary in one or more embodiments of the present invention without affecting the features of the technical solutions described herein. In some embodiments of the present invention, the components of the processor 10 can be combined, separated, or different from those described herein.

Figure 8:
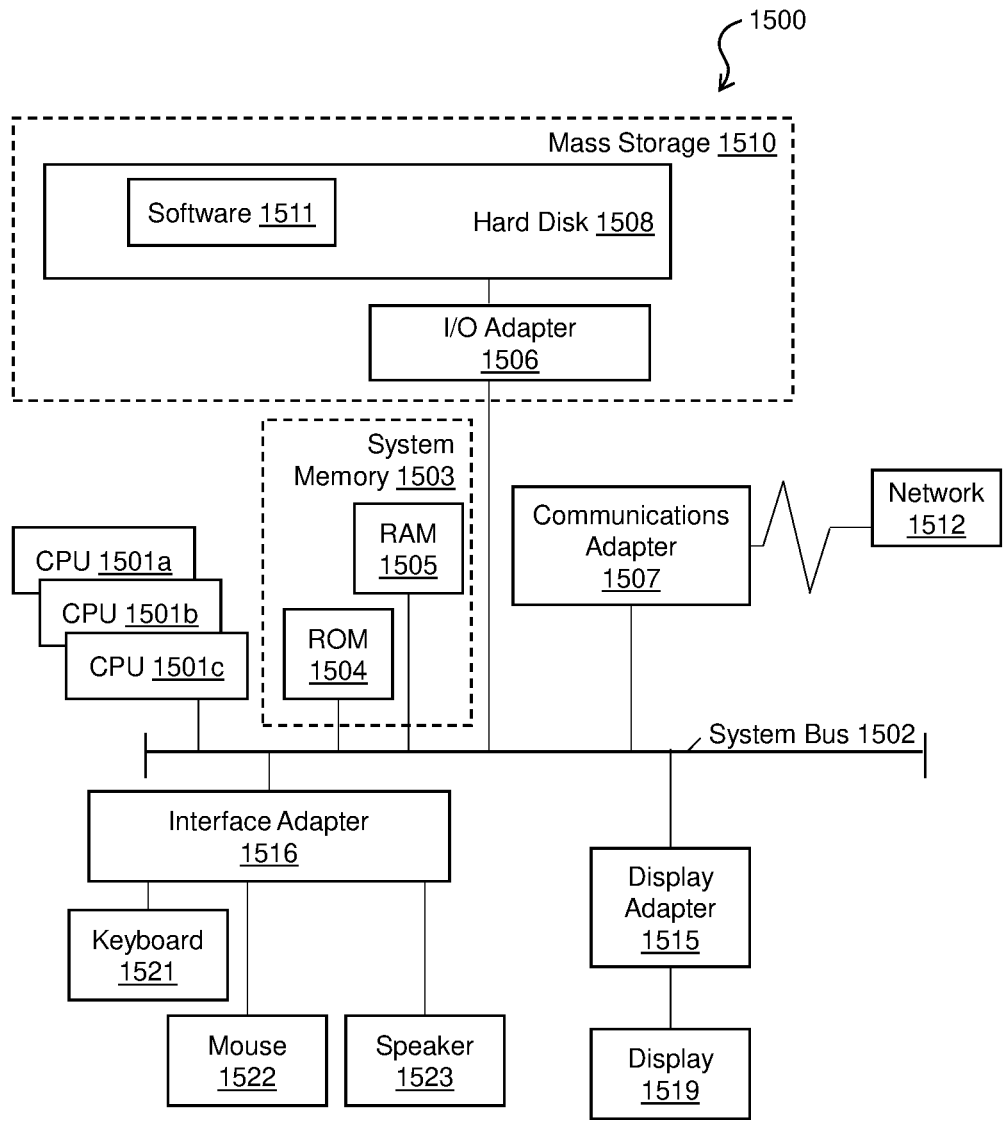
FIG. 8 depicts a computing system according to one or more embodiments of the present invention.

Turning now to FIG. 8, a computer system 1500 is generally shown in accordance with an embodiment. The computer system 1500 can be a target computing system being used to perform one or more functions that require a modular multiplication and addition operations to be performed. The computer system 1500 can be an electronic, computer framework comprising and/or employing any number and combination of computing devices and networks utilizing various communication technologies, as described herein. The computer system 1500 can be easily scalable, extensible, and modular, with the ability to change to different services or reconfigure some features independently of others. The computer system 1500 may be, for example, a server, desktop computer, laptop computer, tablet computer, or smartphone. In some examples, computer system 1500 may be a cloud computing node. Computer system 1500 may be described in the general context of computer system executable instructions, such as program modules, being executed by a computer system. Generally, program modules may include routines, programs, objects, components, logic, data structures, and so on that perform particular tasks or implement particular abstract data types. Computer system 1500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 1500 has one or more central processing units (CPU(s)) 1501a, 1501b, 1501c, etc. (collectively or generically referred to as processor(s) 1501). The processors 1501 can be a single-core processor, multi-core processor, computing cluster, or any number of other configurations. The processors 1501, also referred to as processing circuits, are coupled via a system bus 1502 to a system memory 1503 and various other components. The system memory 1503 can include a read only memory (ROM) 1504 and a random access memory (RAM) 1505. The ROM 1504 is coupled to the system bus 1502 and may include a basic input/output system (BIOS), which controls certain basic functions of the computer system 1500. The RAM is read-write memory coupled to the system bus 1502 for use by the processors 1501. The system memory 1503 provides temporary memory space for operations of said instructions during operation. The system memory 1503 can include random access memory (RAM), read only memory, flash memory, or any other suitable memory systems.

The computer system 1500 comprises an input/output (I/O) adapter 1506 and a communications adapter 1507 coupled to the system bus 1502. The I/O adapter 1506 may be a small computer system interface (SCSI) adapter that communicates with a hard disk 1508 and/or any other similar component. The I/O adapter 1506 and the hard disk 1508 are collectively referred to herein as a mass storage 1510.

Software 1511 for execution on the computer system 1500 may be stored in the mass storage 1510. The mass storage 1510 is an example of a tangible storage medium readable by the processors 1501, where the software 1511 is stored as instructions for execution by the processors 1501 to cause the computer system 1500 to operate, such as is described herein below with respect to the various Figures. Examples of computer program product and the execution of such instruction is discussed herein in more detail. The communications adapter 1507 interconnects the system bus 1502 with a network 1512, which may be an outside network, enabling the computer system 1500 to communicate with other such systems. In one embodiment, a portion of the system memory 1503 and the mass storage 1510 collectively store an operating system, which may be any appropriate operating system, such as the z/OS or AIX operating system from IBM Corporation, to coordinate the functions of the various components shown in FIG. 8.

Additional input/output devices are shown as connected to the system bus 1502 via a display adapter 1515 and an interface adapter 1516 and. In one embodiment, the adapters 1506, 1507, 1515, and 1516 may be connected to one or more I/O buses that are connected to the system bus 1502 via an intermediate bus bridge (not shown). A display 1519 (e.g., a screen or a display monitor) is connected to the system bus 1502 by a display adapter 1515, which may include a graphics controller to improve the performance of graphics intensive applications and a video controller. A keyboard 1521, a mouse 1522, a speaker 1523, etc. can be interconnected to the system bus 1502 via the interface adapter 1516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 1500 includes processing capability in the form of the processors 1501, and, storage capability including the system memory 1503 and the mass storage 1510, input means such as the keyboard 1521 and the mouse 1522, and output capability including the speaker 1523 and the display 1519.

In some embodiments, the communications adapter 1507 can transmit data using any suitable interface or protocol, such as the internet small computer system interface, among others. The network 1512 may be a cellular network, a radio network, a wide area network (WAN), a local area network (LAN), or the Internet, among others. An external computing device may connect to the computer system 1500 through the network 1512. In some examples, an external computing device may be an external webserver or a cloud computing node.

It is to be understood that the block diagram of FIG. 8 is not intended to indicate that the computer system 1500 is to include all of the components shown in FIG. 8. Rather, the computer system 1500 can include any appropriate fewer or additional components not illustrated in FIG. 8 (e.g., additional memory components, embedded controllers, modules, additional network interfaces, etc.). Further, the embodiments described herein with respect to computer system 1500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processing unit, an instruction to perform a fused modular multiply and add operation to compute d=((a*b)+c) % p, wherein a, b, and c are provided as a set of operands;
computing, by a first multiply-and-accumulate unit, a binary multiplication to compute a*b;
computing, by a second multiply-and-accumulate unit, a first intermediate result by updating a result of the binary multiplication using p;
initializing an accumulator of a third multiply-and-accumulate unit with c;
computing, by the third multiply-and-accumulate unit, a second intermediate result using the first intermediate result and c;
subtracting, by an adder, a portion of the second intermediate result from a portion of the result of the binary multiplication; and
outputting, as a result of the fused modular multiply and add operation, an output of the adder.

2. The computer-implemented method of claim 1, wherein the adder has a bit-width wider than a multiplier in the first multiply-and-accumulate unit.

3. The computer-implemented method of claim 2, wherein the bit-width of the adder is one more than the bit-width of the first multiplier.

4. The computer-implemented method of claim 1, wherein initializing the accumulator of the third multiply-and-accumulate unit with c comprises storing a value of c in lower order bits of the accumulator.

5. The computer-implemented method of claim 1, wherein computing the first intermediate result comprises performing a second binary multiplication of the result of the binary multiplication of a*b with a precomputed constant.

6. The computer-implemented method of claim 5, wherein computing the second intermediate result comprises multiplying higher order bits of the first intermediate result with modulus p, wherein a value of p is stored in the third multiply-and-accumulate unit prior to invoking the instruction.

7. The computer-implemented method of claim 1, further comprising correcting the output of the adder to ensure that the output is between 0 and p.

8. A system comprising:
a set of registers; and
a set of multiply-and-accumulate units comprising three multiply-and-accumulate units, each comprising a multiplier and an accumulator, the set of multiply-and-accumulate units coupled with the set of registers, the set of multiply-and-accumulate units is configured to perform a method for performing a fused modular multiply and add operation to compute d=((a*b)+c) % p, wherein a, b, and c are provided in the set of registers, and wherein performing the fused modular multiply and add operation comprises:
computing, by a first multiply-and-accumulate unit, a binary multiplication to compute a*b;
computing, by a second multiply-and-accumulate unit, a first intermediate result by updating a result of the binary multiplication using p;
initializing an accumulator from a third multiply-and-accumulate unit with c;
computing, by the third multiply-and-accumulate unit, a second intermediate result using the first intermediate result and c;
subtracting, by an adder, a portion of the second intermediate result from a portion of the result of the binary multiplication; and
outputting, as a result of the fused modular multiply and add operation, an output of the adder.

9. The system of claim 8, wherein the adder has a bit-width wider than a multiplier in the first multiply-and-accumulate unit.

10. The system of claim 9, wherein the bit-width of the adder is one more than the bit-width of the first multiplier.

11. The system of claim 8, wherein initializing the accumulator from the third multiply-and-accumulate unit with c comprises storing a value of c in lower order bits of the accumulator.

12. The system of claim 8, wherein computing the first intermediate result comprises perform a second binary multiplication of the result of the binary multiplication of a*b with a precomputed constant.

13. The system of claim 12, wherein computing the second intermediate result comprises multiplying higher order bits of the first intermediate result with modulus p, wherein value of p is stored in the third multiply-and-accumulate unit prior to invoking an instruction to perform the fused multiply and add operation.

14. The system of claim 8, further comprising correcting the output of the adder to ensure that the output is between 0 and p.

15. A computer program product comprising a computer-readable memory that has computer-executable instructions stored thereupon, the computer-executable instructions when executed by a processor cause the processor to perform a method for performing a fused modular multiply and add operation to compute d=((a*b)+c) % p, wherein a, b, and c are provided as operands, and wherein performing the fused modular multiply and add operation comprises:
computing, by a first multiply-and-accumulate unit, a binary multiplication to compute a*b;
computing, by a second multiply-and-accumulate unit, a first intermediate result by updating a result of the binary multiplication using p;
initializing an accumulator from a third multiply-and-accumulate unit with c;
computing, by the third multiply-and-accumulate unit, a second intermediate result using the first intermediate result and c;
subtracting, by an adder, a portion of the second intermediate result from a portion of the result of the binary multiplication; and
outputting, as a result of the fused modular multiply and add operation, an output of the adder.

16. The computer program product of claim 15, wherein the bit-width of the adder is one more than the bit-width of a multiplier in the first multiply-and-accumulate unit.

17. The computer program product of claim 15, wherein initializing the accumulator from the third multiply-andaccumulate unit with c comprises storing a value of c in lower order bits of the accumulator.

18. The computer program product of claim 15, wherein computing the first intermediate result comprises perform a second binary multiplication of the result of the binary multiplication of a*b with a precomputed constant.

19. The computer program product of claim 18, wherein computing the second intermediate result comprises multiplying higher order bits of the first intermediate result with modulus p, wherein value of p is stored in the third multiply-and-accumulate unit prior to invoking an instruction to perform the fused multiply and add operation.

20. The computer program product of claim 15, further comprising correcting the output of the adder to ensure that the output is between 0 and p.

* * * * *